R. O. WELLS.
FISHING BOB.
APPLICATION FILED JUNE 29, 1915.

1,176,631.

Patented Mar. 21, 1916.

Witnesses
J. H. Crawford

Inventor
R. O. Wells,
By Victor J. Evans
Attorney

UNITED STATES PATENT OFFICE.

RICHARD O. WELLS, OF ST. LOUIS, MISSOURI.

FISHING-BOB.

1,176,631.      Specification of Letters Patent.      Patented Mar. 21, 1916.

Application filed June 29, 1915. Serial No. 37,001.

*To all whom it may concern:*

Be it known that I, RICHARD O. WELLS, a citizen of the United States, residing at St. Louis, in the State of Missouri, have invented new and useful Improvements in Fishing-Bobs, of which the following is a specification.

This invention relates to fishing bobs or floats and the principal object of the invention is to provide a bob having means for permitting its convenient removal from and adjustment upon the line without removing the hook or sinker. In most all devices of this character, the line is passed through clamping rings or looped around the projecting stems of the cork or passed through the cork in such manner that it is necessary to remove the sinker and hook before the cork can be removed from the line. All floats having the above characteristics are objectionable on this account and on account of the fact that they are difficult to adjust upon the line.

It is, therefore, the object of this invention to provide a float or bob which is conveniently connected to and removed from the line and which is as conveniently adjusted so as to secure the proper relative position between the float and the hook.

Further objects of the invention will appear as the following specific description is read in connection with the accompanying drawing which forms a part of this application, and in which:—

Figure 1:
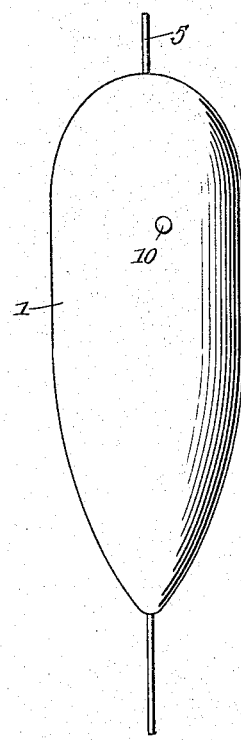
Figure 2:
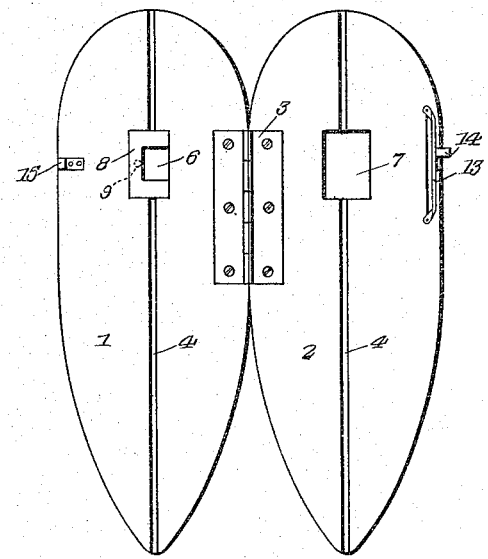
Figure 3:
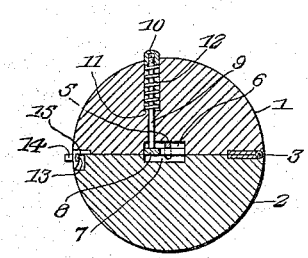

Figure 1 is an elevation showing the float in operative position. Fig. 2 is a similar view showing the halves opened. Fig. 3 is a detail transverse sectional view.

Referring more particularly to the drawing, the float is constructed of a pair of substantially semi-oval sections 1 and 2 connected together intermediate their length by a hinge 3 which permits the sections to fold upon one another as shown in Fig. 1 or to open, as shown in Fig. 3. Each section is provided with a longitudinal groove 4 to receive the line 5 and adjacent the hinge in either section are recesses 6 and 7.

Seated in the recesses 6 and arranged to receive a line beneath the same so as to clamp the line against the bottom wall of the recess, is a substantially U-shaped clamping member 8 having connected thereto a plunger 9 passing transversely through the section 1 and secured to an operating button or cap 10. Surrounding the plunger and arranged between the cap 10 and a shoulder 11, is a spiral spring 12 which holds the clamping member 8 against the line until the plunger is actuated by pressing inwardly upon the bottom 10, the recess 7 receiving the clamping member when released from the line. As shown, the operating button 10 is threaded upon the plunger so that the tension of the spring 12 may be readily adjusted.

Secured to the section 2 is a bail-shaped keeper 13 of spring material having an operating button 14 secured thereto. This keeper is arranged to engage a shoulder catch 15 secured to the opposite half 1 so as to hold the parts in closed position, as shown in Fig. 1.

When the line 5 has been placed in the grooves and the sections closed, the float will be held firmly against accidental displacement on the line. By pressing the button 10, the cranking member will be released from the line which extends beneath the legs thereof, thereby permitting the float to be adjusted on the line, in either direction. When the button 14 is pressed, the keeper will be released.

What is claimed is:—

A fishing bob comprising a pair of hingedly connected sections having longitudinally extending line receiving grooves, a clamping member extending across one of the grooves, a plunger connected to the clamping member and extending through the adjoining section, and adjustable means for actuating the plunger to cause the clamping means to bind the line against the section.

In testimony whereof I affix my signature in presence of two witnesses.

RICHARD O. WELLS.

Witnesses:
   IVA H. WELLS,
   R. M. WELLS.

Copies of this patent may be obtained for five cents each, by addressing the "Commissioner of Patents, Washington, D. C."